United States Patent [19]

Matsen et al.

[11] Patent Number: 5,760,379

[45] Date of Patent: Jun. 2, 1998

[54] MONITORING THE BOND LINE TEMPERATURE IN THERMOPLASTIC WELDS

[75] Inventors: Marc R. Matsen, Seattle; Karl A. Hansen, deceased, late of Seattle; John J. deJong, executor, Bellevue, all of Wash.

[73] Assignee: The Boeing Company

[21] Appl. No.: 548,823

[22] Filed: Oct. 26, 1995

[51] Int. Cl.[6] ........................................ H05B 6/10
[52] U.S. Cl. .......................... 219/633; 219/546; 219/663; 219/554
[58] Field of Search ................................ 219/538, 534, 219/658, 656, 659, 647, 618, 649, 759, 670, 608, 625, 626, 627, 650, 615, 617, 645, 660; 156/64, 272.2, 272.4

[56] References Cited

U.S. PATENT DOCUMENTS

| | | |
|---|---|---|
| 2,241,312 | 5/1941 | Luty . |
| 2,273,423 | 2/1942 | Somes . |
| 2,372,929 | 4/1945 | Blessing . |
| 2,378,801 | 6/1945 | Sidell et al. . |
| 2,423,922 | 7/1947 | Arndt, Jr. . |
| 2,589,777 | 3/1952 | Collins . |
| 2,739,829 | 3/1956 | Pedlow et al. . |
| 2,761,941 | 9/1956 | Ardichvilli . |
| 2,898,435 | 8/1959 | Crafts . |
| 3,061,503 | 10/1962 | Gould et al. . |
| 3,101,403 | 8/1963 | Lewis et al. . |
| 3,183,460 | 5/1965 | Bennon . |
| 3,288,979 | 11/1966 | Mills et al. . |
| 3,395,261 | 7/1968 | Leatherman et al. . |
| 3,427,421 | 2/1969 | Matheson et al. . |
| 3,431,379 | 3/1969 | Yrene . |
| 3,435,172 | 3/1969 | Emerson . |
| 3,450,856 | 6/1969 | Buck et al. . |
| 3,492,453 | 1/1970 | Hurst . |
| 3,507,735 | 4/1970 | Chisholm . |
| 3,574,031 | 4/1971 | Heller, Jr. et al. . |
| 3,616,075 | 10/1971 | Jarvis et al. ................ 156/479 |
| 3,845,268 | 10/1974 | Sindt . |
| 3,864,186 | 2/1975 | Balla . |
| 3,941,643 | 3/1976 | Balla . |
| 3,946,349 | 3/1976 | Haldeman, III . |
| 3,996,402 | 12/1976 | Sindt . |
| 4,005,302 | 1/1977 | Graf et al. . |
| 4,029,837 | 6/1977 | Leatherman . |
| 4,029,926 | 6/1977 | Austin . |
| 4,091,254 | 5/1978 | Struve . |
| 4,120,712 | 10/1978 | Sindt . |
| 4,180,717 | 12/1979 | Lenk et al. . |
| 4,288,271 | 9/1981 | Campbell, Jr. et al. . |
| 4,288,673 | 9/1981 | Ishibashi . |
| 4,296,295 | 10/1981 | Kiuchi . |
| 4,304,975 | 12/1981 | Lenk et al. . |
| 4,313,777 | 2/1982 | Buckley et al. . |
| 4,343,982 | 8/1982 | Schwartz et al. . |
| 4,355,222 | 10/1982 | Geithman et al. . |

(List continued on next page.)

FOREIGN PATENT DOCUMENTS

| | | |
|---|---|---|
| 0 461 979 | 4/1994 | European Pat. Off. . |
| 54-25542 | 2/1979 | Japan . |
| WO 82/0259 | 8/1982 | Japan . |

OTHER PUBLICATIONS

J. Giachino, Welding Skills and Practices, Am. Tech. Soc., Chicago, IL (1960,1965,1967,1971,1976) 393–401.

J. Border et al., Induction Heated Joining of Thermoplastic Composites Without Metal Susceptors, 34th Int'l SAMPE Sym., May 8–11, 1989, pp. 2569–2578.

A. Sumida et a., PAN Based Modulus Graphitized Carbon Fiber Torayca M60J, 34th Int'l SAMPE Sym., May 8–11, 1989, pp. 2579–2589.

*Primary Examiner*—Tu B. Hoang
*Attorney, Agent, or Firm*—John C. Hammar

[57] ABSTRACT

Quality welds are highly dependent upon achieving appropriate temperatures everywhere along the bond line. The present invention uses multinode thermocouples to measure the bond line temperature in real time and to provide control signals for the moving coil (welding head).

18 Claims, 5 Drawing Sheets

U.S. PATENT DOCUMENTS

| | | |
|---|---|---|
| 4,382,113 | 5/1983 | Schwartz et al. . |
| 4,416,713 | 11/1983 | Brooks . |
| 4,421,588 | 12/1983 | Davies . |
| 4,445,951 | 5/1984 | Lind et al. . |
| 4,489,123 | 12/1984 | Schijve et al. . |
| 4,521,659 | 6/1985 | Buckley et al. . |
| 4,642,155 | 2/1987 | Ramsey . |
| 4,653,396 | 3/1987 | Wennerberg . |
| 4,671,470 | 6/1987 | Jonas . |
| 4,673,450 | 6/1987 | Burke . |
| 4,684,789 | 8/1987 | Eggleston . |
| 4,749,833 | 6/1988 | Novorsky et al. . |
| 4,768,433 | 9/1988 | Boissevain . |
| 4,791,260 | 12/1988 | Waldman . |
| 4,822,972 | 4/1989 | Sugioka et al. . |
| 4,897,518 | 1/1990 | Mucha et al. . |
| 4,904,972 | 2/1990 | Mori et al. . |
| 4,919,759 | 4/1990 | Ilmarinen et al. . |
| 4,943,706 | 7/1990 | Lyall et al. . |
| 4,947,464 | 8/1990 | Mori et al. . |
| 4,978,825 | 12/1990 | Schmidt et al. . |
| 5,001,319 | 3/1991 | Holmstrom . |
| 5,047,605 | 9/1991 | Ogden . |
| 5,074,019 | 12/1991 | Link . |
| 5,079,817 | 1/1992 | Anstotz et al. . |
| 5,101,086 | 3/1992 | Dion et al. . |
| 5,199,791 | 4/1993 | Kasanami et al. . |
| 5,240,542 | 8/1993 | Miller et al. . |
| 5,248,864 | 9/1993 | Kodokian . |
| 5,250,776 | 10/1993 | Pfaffmann . |
| 5,283,409 | 2/1994 | Brendel et al. . |
| 5,313,034 | 5/1994 | Grimm et al. . |
| 5,313,037 | 5/1994 | Hansen et al. . |
| 5,340,428 | 8/1994 | Kodokian . |
| 5,444,220 | 8/1995 | Hansen et al. . |
| 5,486,684 | 1/1996 | Peterson et al. ............ 219/633 |
| 5,500,511 | 3/1996 | Hansen et al. ............ 219/633 |
| 5,508,496 | 4/1996 | Hansen et al. ............ 219/633 |
| 5,573,613 | 11/1996 | Lunden ............ 156/64 |
| 5,624,594 | 4/1997 | Matsen et al. ............ 219/633 |

MONITORING THE BOND LINE TEMPERATURE IN THERMOPLASTIC WELDS

TECHNICAL FIELD

The present invention relates to a method for monitoring the temperature along the bond line in a thermoplastic weld using multinode thermocouples and to a method for controlling the heating along the bond line in conjunction with the measured temperature to achieve a quality weld.

BACKGROUND ART

Three major joining technologies exist for aerospace composite structure: mechanical fastening; adhesive bonding; and welding. Both mechanical fastening and adhesive bonding are costly, time consuming assembly steps that introduce excess cost even if the parts that are assembled are fabricated from components produced by an emerging, cost efficient process. Mechanical fastening requires expensive hole locating, drilling, shimming, and fastener installation, while adhesive bonding usually requires complicated surface pretreatments.

In contrast, composite welding, which eliminates fasteners, features the ability to join thermoplastic composite components at high speeds with minimum touch labor and little, if any, pretreatments. In our experience, the welding interlayer, called a susceptor, also can simultaneously take the place of shims required in mechanical fastening. As such, composite welding holds promise to be an affordable joining process. For "welding" thermoplastic and thermoset composite parts together, the resin that the susceptor melts functions as a hot melt adhesive. If fully realized, the thermoplastic-thermoset bonding will further reduce the cost of composite assembly.

Thermoplastic welding is a process for forming a fusion bond between two faying thermoplastic faces of two parts. A fusion bond is created when the thermoplastic on the surface of the two parts is heated to the melting or softening point and the two surfaces are brought into contact, so that the molten thermoplastic mixes to result in a deep inter diffusion, and the surfaces are held in contact while the thermoplastic cools below the softening temperature.

There is a large stake in developing a successful induction welding process. Its advantages versus traditional composite joining methods are:

reduced parts count versus fasteners minimal surface preparation, in most cases a simple solvent wipe to remove surface contaminants indefinite shelf life at room temperature short process cycle time, typically measured in minutes enhanced joint performance, especially hot/wet and fatigue permits rapid field repair of composites or other structures.

There is little or no loss of bond strength after prolonged exposure to environmental influences.

The exponential decay of the strength of magnetic fields with their distance from their source dictates that, in induction welding processes, the structure closest to the induction coil will be the hottest, since it experiences the strongest field. Therefore, it is difficult to obtain adequate heating at the bond line between two graphite or carbon fiber reinforced resin matrix composites relying on the susceptibility of the fibers alone as the source of heating in the assembly. For the inner plies to be hot enough to melt the resin, the outer plies closer to the induction coil and in the stronger magnetic field are too hot. The matrix resin in the entire piece of composite melts. The overheating results in porosity in the product, delamination, and, in some case, destruction or denaturing of the resin. To avoid overheating of the outer plies and to insure adequate heating of the inner plies, a susceptor of significantly higher conductivity than the fibers is used to peak the heating selectively at the bond line of the plies when heating from one side. An electromagnetic induction coil on one side of the assembly heats a susceptor to melt and cure a thermoplastic resin (also sometimes referred to as an adhesive) to bond the elements of the assembly together. Often the current density in the susceptor is higher at the edges of the susceptor than in the center because of the nonlinearity of the coil. This problem typically occurs when using a cup core induction coil like that described in U.S. Pat. No. 5,313,037 and can result in overheating the edges of the assembly or underheating the center, either condition leading to inferior welds because of nonuniform curing. It is necessary to have an open or mesh pattern in the susceptor to allow the resin to bond between the composite elements of the assembly when the resin heats and melts. Misalignment can also result in temperature variations, producing excessive heating in isolated locations across the bond line because of the induction physics.

U.S. Pat. No. 4,673,450 describes a method to spot weld graphite fiber reinforced PEEK composites using a pair of electrodes After roughening the surfaces of the prefabricated PEEK composites in the region of the bond, Burke placed a PEEK adhesive ply along the bond line, applied a pressure of about 50–100 psi through the electrodes, and heated the embedded graphite fibers by applying a voltage in the range of 20–40 volts at 30–40 amps for approximately 5–10 seconds with the electrodes. Access to both sides of the assembly is required in this process which limits its application.

Prior art disclosing thermoplastic welding with induction heating is illustrated by U.S. Pat. Nos. 3,996,402 and 4,120,712. In these patents, the investigators used metallic susceptors of a conventional type having a regular pattern of openings of traditional manufacture. Achieving a uniform, controllable temperature in the bond line, which is crucial to preparing a thermoplastic weld of adequate integrity to permit use of welding in aerospace primary structure, is difficult with those conventional susceptors, as we discussed and illustrated in U.S. Pat. No. 5,500,511.

Simple as the thermoplastic welding process sounds, and easy as it is to perform in the laboratory on small pieces, it becomes difficult to perform reliably and repeatably in a real factory on full-scale parts to build a large structure such as an airplane wing box. The difficulty is in getting the proper amount of heat to the bond line without overheating the entire structure, and also in achieving intimate contact of the faying surfaces of the two parts at the bond line during heating and cooling despite the normal imperfections in the flatness of composite parts, thermal expansion of the thermoplastic during heating to the softening or melting temperature, flow of the thermoplastic out of the bond line under pressure, and then contraction of the thermoplastic in the bond line during cooling.

a. Moving coil welding processes

In U.S. Pat. No. 5,500,511, we described a tailored susceptor for approaching the desired temperature uniformity in the bond line during thermoplastic welding using an induction coil as a heat source. This susceptor relied upon carefully controlling the geometry of openings in the susceptor (both their orientation and their spacing) to distribute the heat evenly. For example, we suggested using a regular array of anisotropic, diamond shaped openings with a ratio of the length (L) to the width (W) greater than 1 to provide a superior weld over that achieved using a susceptor having a similar array, but one where the L/W ratio was one. By changing the length to width ratio (the aspect ratio) of the diamond-shaped openings in the susceptor, we achieved a large difference in the longitudinal and transverse conductivity in the susceptor, and, thereby, tailored the current density within the susceptor. A tailored susceptor having openings with a length (L) to width (W) ratio of 2:1 has a longitudinal conductivity about four times the transverse conductivity. In addition to tailoring the shape of the openings to tailor the susceptor, we altered the current density in regions near the edges by increasing the foil density (i.e., the absolute amount of metal). Increasing the foil density along the edge of the susceptor increases the conductivity along an edge and reduces the current density and the edge heating. We increased foil density by folding the susceptor to form edge strips of double thickness or by compressing openings near the edge of an otherwise uniform susceptor. We found these susceptors difficult to reproduce reliably. Also, their use forced careful placement of the susceptor and alignment with the coil to achieve the desired effect.

The tailored susceptor was primarily designed for use with the cup core induction coil of U.S. Pat. No. 5,500,511 or U.S. Pat. No. 5,313,037. With this coil, the magnetic field is strongest near the edges because the central pole creates a null at the center. Therefore, the susceptor is designed to counter the higher field at the edges by accommodating the induced current near the edges. The high longitudinal conductivity encourages induced currents to flow longitudinally.

With the tailored susceptor or with other moving coil welding operations, achieving the proper bond line temperature requires empirical design calibration. Even then, the bond line temperature may fluctuate within a relatively wide range because of misalignment, variations in the susceptor, variations in the geometry (such as skin plies or spar curvature), or variations in coil speed or coil power. The calibration curves are for a specified power at a specified head speed, geometry, and material system. The allowables data must be quite extensive, and there is still no assurance that an actual run is producing a weld that corresponds to the test data. Therefore, monitoring the bond line temperature in real time takes on greater significance to achieving process control and quality welds.

We described our selvaged susceptor for thermoplastic welding in U.S. Pat. No. 5,508,496. That selvaged susceptor also controls the current density pattern during eddy current heating by an induction coil to provide substantially uniform heating to a composite assembly and to insure the strength and integrity of the weld in the completed part. The selvaged susceptor is particularly desirable for welding ribs between prior welded spars using an asymmetric induction coil, because, with that coil, it provides a controllable area of intense, uniform heating, a trailing region with essentially no heating, and a leading region with minor preheating.

We achieved better performance (i.e., more uniform heating) in rib welding by using a selvaged susceptor which has a central porous portion and edge strips of solid metal without openings. We embed the susceptor in a thermoplastic resin to make a susceptor/resin tape that is easy to handle and to use in assembling the composite pieces prior to welding. Also, we have discovered that, with a selvaged susceptor, the impedance of the central portion should be anisotropic with a lower transverse impedance than the longitudinal impedance. Here, the L/W ratio of diamond shaped openings should be less than or equal to one. That is, unlike our tailored susceptor of U.S. Pat. No. 5,500,511, L for the selvaged susceptor of U.S. Pat. No. 5,508,496 should be less than W. With this new selvaged susceptor in the region immediately under the preferred asymmetric induction work coil described in U.S. Pat. No. 5,444,220, we encourage the current to flow across the susceptor to the edges where the current density is lowest and the conductivity, highest.

Generally, we form the selvaged susceptor somewhat wider than the bond line so that the selvage edge strips are not in the bond line. We remove the selvage edge strips after forming the weld, leaving only a perforated susceptor foil in the weld. This foil has a relatively high open area fraction.

A structural susceptor allows us to include fiber reinforcement within the weld resin to alleviate residual tensile strain otherwise present in an unreinforced weld. The susceptor includes alternating layers of thin film thermoplastic resin sheets and fiber reinforcement (usually woven fiberglass fiber) sandwiching the conventional metal susceptor that is embedded in the resin, and is described in greater detail in U.S. patent application Ser. No. 08/471,625. While the number of total plies in this structural susceptor is usually not critical, we prefer to use at least two plies of fiber reinforcement on each side of the susceptor.

The structural susceptor permits gap filling between the welded composite laminates which tailors the thickness (number of plies) in the structural susceptor to fill the gaps, thereby eliminating costly profilometry of the faying surfaces and the inherent associated problem of resin depletion at the faying surfaces caused by machining the surfaces to have complementary contours. Standard manufacturing tolerances produce gaps as large as 0.120 inch, which is too wide to create a quality weld using the conventional susceptors.

We can easily tailor the thickness of the structural susceptor to match the measured gap by scoring through the appropriate number of plies of resin and fiber reinforcement and peeling them off. In doing so, a resin side layer will be on both faying surfaces and this layer should insure better performance from the weld.

The need for a susceptor in the bond line poses many obstacles to the preparation of quality parts. The metal which is used because of its high susceptibility differs markedly in physical properties from the resin or fiber reinforcement, so dealing with it becomes a significant issue. A reinforced susceptor overcomes problems with conventional susceptors by including the delicate metal foils (0.10–0.20 in wide×0.005–0.010 inch thick; preferably 0.10×0.007 in) in tandem with the warp fibers of the woven reinforcement fabric, as described in greater detail in U.S. patent application Ser. No. 08/469,986. The foil is always on the remote side of the fabric because it is between the warp thread and the weave threads. This arrangement holds the foils in place longitudinally in the fabric in electrical isolation from each other, yet substantially covering the entire width of the weld surface. This arrangement still allows adequate space for the flow and fusion of the thermoplastic resin. Furthermore, in the bond line, the resin can contact, wet, and bond with the reinforcing fiber rather than being presented with the resinphilic metal of the conventional systems. There will be a resin-fiber interface with only short runs of a resin-metal interface. The short runs are the length of the diameter of two weave fibers plus the spatial gap between the weave fibers, which is quite small. Thus, the metal is shielded within the fabric and a better bond results. In this woven arrangement the foil can assume readily the contour of the reinforcement Finally, the arrangement permits efficient heat transfer from the foil to the resin in the spatial region where the bond will form.

Researchers have expended significant effort in developing inductor and susceptor systems to optimize the heating of the bond line in the thermoplastic assemblies. Two such systems are described in our copending U.S. patent application Ser. Nos. 08/367,557 and 08/564,566 by Lunden for a "Self-Steering System for Guiding a Moving Coil in Thermoplastic Welding, which we incorporate by reference.

Another hurdle remaining to perfect the welding process to the point of practical utility for producing large scale aerospace-quality structures in a production environment is the aspect of the process dealing with the control of the surface contact of the faying surfaces of the two parts to be welded together. The timing, intensity, and schedule of heat application must be controlled so the material at the faying surfaces is brought to and maintained within the proper temperature range for the requisite amount of time for an adequate bond to form, and is maintained in intimate contact while the melted or softened material hardens in its bonded condition.

Large scale parts such as wing spars and ribs, and the wing skins that are bonded to the spars and ribs, are typically on the order of 20–30 feet long at present, and potentially, can be several hundred feet in length when the process is perfected for commercial transport aircraft. Parts of this magnitude are difficult to produce with perfect flatness. Instead, the typical part will have various combinations of surface deviations from perfect flatness, including large scale waviness in the direction of the major length dimension, twist about the longitudinal axis, dishing or sagging of "T" beam flanges, and small scale surface defects such as asperities and depressions. These irregularities interfere with full surface area contact between the faying surfaces of the two parts and result in surface contact only at a few "high points" across the intended bond line. We achieve additional surface contact by applying pressure to the parts to force the faying surfaces into contact, but full intimate contact is still difficult or impossible to achieve. Applying heat to the interface by electrically heating the susceptor in connection with pressure on the parts flattens the irregularities, but that time that is needed to achieve full intimate contact with the use of heat and pressure is excessive, and may result in deformation of the top part When the overall temperature of the "T" beam flange is raised to the softening point, it will begin to yield or sag under the application of the pressure needed to achieve a good bond. We lose either adequate pressure in the weld or part configuration because of the sagging.

Our multipass thermoplastic welding process described in U.S. Pat. No. 5,486,684 enables a moving coil welding process to produce continuous or nearly continuous fusion bonds over the full area of the bond line to yield high strength welds reliably, repeatably and with consistent quality. This process produces improved low cost, high strength composite assemblies of large scale parts, fusion bonded together with consistent quality. The process uses a schedule of heat application that maintains the overall temperature of the structure within the limit in which it retains its high strength, so it requires no internal tooling to support the structure against sagging which otherwise could occur above the high strength temperature limit. The process also produces nearly complete bond line area fusion on standard production composite material parts having the usual surface imperfections and deviations from perfect flatness. Doing so, the process eliminates fasteners and the expense of drilling holes, inspecting the holes and the fasteners, inspecting the fasteners after installation, sealing between the parts and around the fastener and the holes; reducing mismatch of materials; and arcing from the fasteners.

In the process, an induction coil is passed multiple times over a bond line while applying pressure in the region of the coil to the components to be welded, and maintaining the pressure until the resin hardens. The resin at the bond line is heated to the softening or melting temperature with each pass of the induction coil and pressure is exerted to flow the softened/melted resin in the bond line and reduce the thickness of the bond line while improving the intimacy of the faying surface contact with each pass to militate for complete continuity of bond. The total time at the softened or melted condition of the thermoplastic in the faying surfaces is sufficient to attain deep inter diffusion of the polymer chains in the materials of the two faying surfaces throughout the entire length and area of the bond line. Doing so, produces a bond line of improved strength and integrity in the completed part. The total time of the faying surfaces at softened temperature is separated into several segments which allows time for the heat in the interface to dissipate between passes. The entire structure does not reach the temperature at which it loses its strength and begins to sag, so the desired shape and size of the final assembly is maintained.

Another moving coil welding operation seeks to apply a substantially constant and uniform pressure on the entire bond line throughout the welding operation. As described in U.S. patent application Ser. No. 08/367,557, such a welding operation, which we call "fluid tooling," includes an elongated vessel made of fluid impervious flexible material. The vessel has an elongated axis and an open end at each axial end of the vessel, and has a cross sectional dimension sized to accommodate the coil. Each axial end of the vessel is closed and sealed by an end closure. At least one of the end closures is removable for insertion of the coil into the vessel. A linear guide in the vessel extends axially for substantially the full length of the vessel and guides the coil for movement axially through the vessel. Power leads are connected to the coil and extend through a pass-through in one end closure to connect the coil to a source of high frequency electrical power to energize the coil to produce an alternating magnetic field. A motive system is provided for moving the coil axially along the vessel over the bond line at a controlled speed. The motive system generally includes a pair of magnets guided along opposite sides of the vessel and magnetically coupled to a ferromagnetic mass connected to the coil. The magnets are moved along their guides and pull the coil attached to the ferromagnetic mass inside the vessel. A backup structure exerts a downward force along the top of the vessel, pressurizing fluid sealed in the vessel and distributing pressure uniformly over the top surface of the top part to press the top part against the bottom part and facilitate fusion bonding of the thermoplastic in the faying surfaces of the interface.

b. Fixed coil induction welding

We have also experimented with thermoplastic welding using our induction heating workcell and, of course, discovered that the process differs from the moving coil processes because of the coil design and resulting magnetic field. We believe that our fixed coil workcell presents promise for welding at faster cycle times than the moving coil processes because we can heat multiple susceptors simultaneously. We can reduce operations where the moving coil takes hours to minutes in the fixed coil. The keys to the process, however, are achieving controllable temperatures at the bond line in a reliable and reproducible process that assure quality welds of high bond strength. Our fixed coil induces currents to flow in the susceptor differently from the moving coils and covers a larger area. Nevertheless, we have developed processing parameters that permit welding with our induction heating workcell using a susceptor at the bond line.

Another advantage with the fixed coil process is that welding can occur using the same tooling and processing equipment that we use to consolidate the skin, thereby greatly reducing tooling costs. Finally, the fixed coil heats the entire bond line at one time to eliminate the need for skins that are currently used with the moving coil. We can control the temperature and protect against overheating by using our "smart" susceptors as a retort or as the bond line susceptor material or both.

These earlier susceptors were essentially planar (X-Y) structures or laminates of planar films. The welds lack reinforcement in the Z-plane, but welds can include such reinforcement (with corresponding improvement in the pulloff strength) if they incorporate a barbed susceptor of U.S. patent application Ser. No. 08/486,560. A barbed susceptor uses a Fe-Ni alloy susceptor that is formed to include barbed, Z-pin reinforcement to provide improved pulloff strength. The alloy chosen for this susceptor has a coefficient of thermal expansion(CTE) that essentially matches the CTE of the composite and a Curie temperature of about 700° F. (370° C.), which is essentially ideal for thermoplastic welding of resins like K3A. For this application, an alloy of 42% Ni–58% Fe that includes $\gamma'$ strengthening elements of Al, Ti and Cb yields both low CTE and high strength. The susceptor is preferably made by laser cutting a foil of the material to form barbed tabs and pushing the cut tabs alternately up and down to give the susceptor a three dimensional character. Alternatively a woven wire mesh may be used in this application with alternating wires ending in the Z direction. The thermoplastic resin cures or consolidates around the barbs during the welding process which provides the pulloff strength improvement c. Temperature monitoring In U.S. patent application Ser. No. 08/367,969, we described a method for determining the susceptor temperature by measuring the change in impedance of the induction coil. As the susceptor heats, its electrical resistance changes as a function of the thermal coefficient of resistance (TCR) of the susceptor material, and that change of resistance is reflected back as a change in the drive coil impedance. An electrical circuit senses the varying impedance/resistance and that change is translated into a change of temperature on a temperature display. The sensing circuit can create a control signal to adjust the power to the coil or the speed of travel of the coil, or both along the bond line. The sensing circuit includes a high power bridge with a sensitive null arm to sense changes in the susceptor impedance due to temperature changes.

A simple L-R bridge detects the changing resistance of the susceptor as its temperature changes during inductive heating. The bridge includes a high-power transformer of about 500 watts operating at about 35–55 kHz connected across a pair of series-connected inductors $L_1$ and $L_2$, and a pair of series-connected resistors $R_1$ and $R_2$. Both series-connected pairs are connected to each other in parallel and in parallel with the transformer. A shunt with a voltage sensor (such as a voltmeter or an oscilloscope) is connected between the two resistors and the tow inductors. The two sides of the bridge are asymmetric by at least 2:1 to put most of the power in the bond line for the sake of efficiency, since power dissipated in the reference side of the bridge is wasted. The two coils $L_1$ and $L_2$ are designed to track fairly closely so that their inductances and Q's (i.e. the dimensionless power ratio of stored to dissipated power) vary consistently with frequency. One coil $L_1$ or $L_2$ is the heating source for the welding operation.

The signal produced by the bridge is used to control the welding process interactively by adjusting the power to the coil in a closed loop RF heating control circuit, or by adjusting the speed of travel of the coil 30 over the bond line, or both, so as to maintain the melt pool temperature within the desired range of optimum processing temperature, that is, about 620±25° F. in the case of the DuPont Avamid K3B polyimide. The signal is conditioned in a suitable conditioning circuit, which would depend on the voltage sensor used and could produce a signal to the power amplifier to turn the amplifier up or down, in the nature of a thermostat control, whenever the melt pool temperature drops below or exceeds the optimal temperature range. Preferably, the signal conditioner circuit produces a signal proportional to the voltage sensor signal to adjust the power to the work coil up or down from a predetermined average power level known to maintain a steady state temperature in the melt pool at the coil speed used. Nevertheless, localized overheating can still be a significant problem, especially if overheating arises form misalignment between the moving coil and the susceptor.

The present invention is a system to monitor the bond line temperature in real time allowing detection of the onset of thermoplastic flow. The system permits guidance control of the induction head to adjust its power, speed, or motion in response to the measured temperature.

SUMMARY OF THE INVENTION

Figure 2:
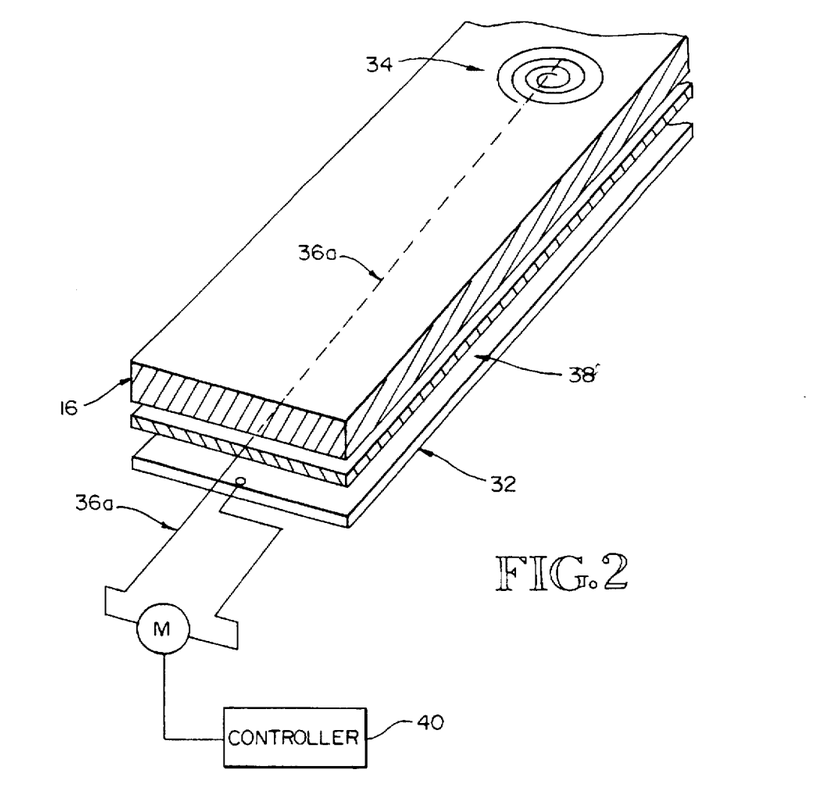
FIG. 2 is a schematic view of a temperature monitoring system of the present invention.
Figure 3:
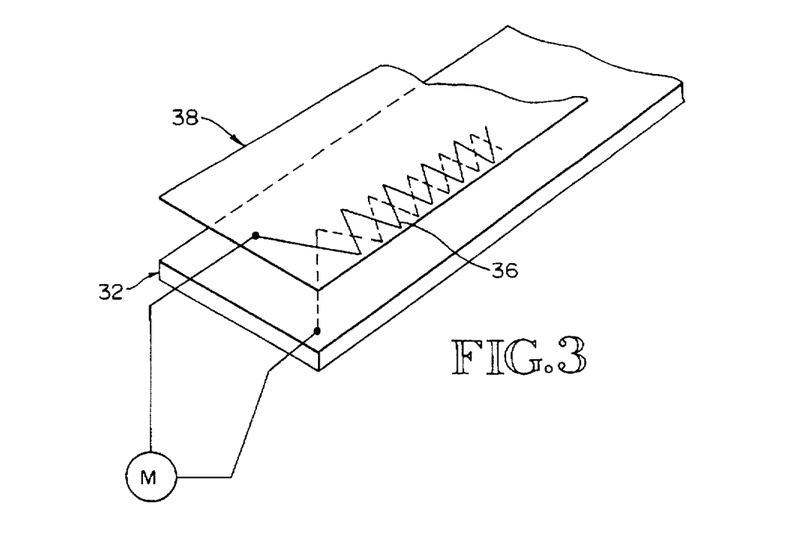
FIG. 3 is a schematic illustration of a single multinode test panel.
Figure 7:
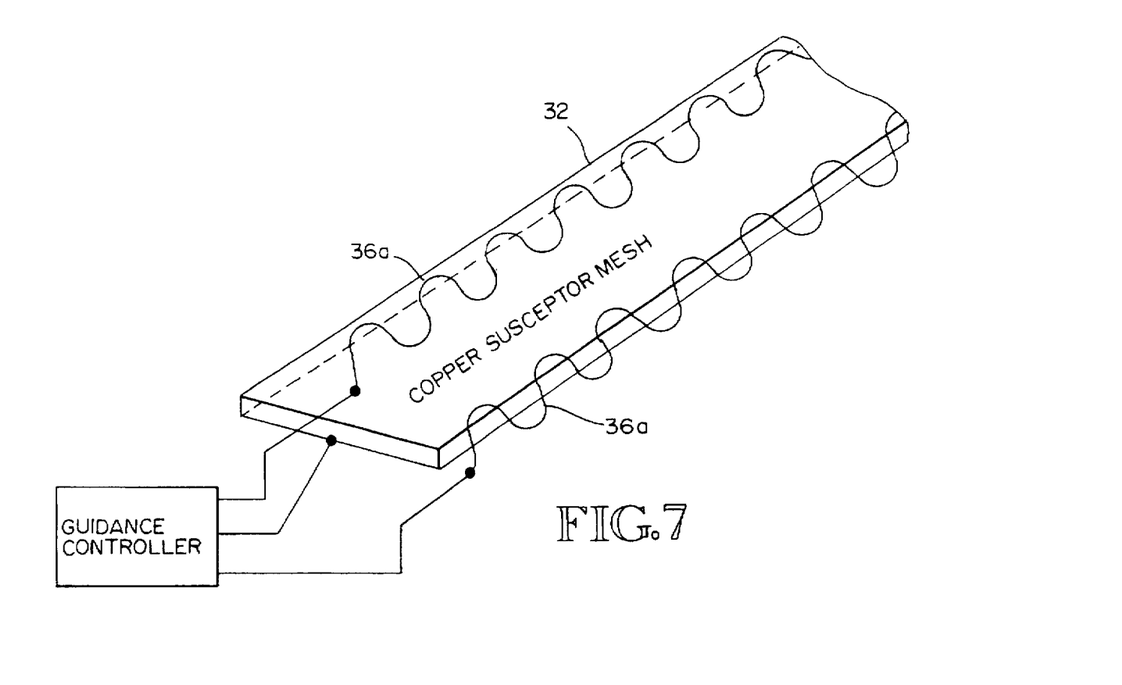
FIG. 7 schematically illustrates a guidance control thermocouple configuration using two constantan thermocouples near edges of the bond line.

The system of the present invention uses sliding junction multinode (M-N) thermocouples extending along the bond line in a layer overlying the susceptor with a thin film of thermoplastic for insulation to separate the thermocouple from the susceptor. The thermocouple is made by twisting the wires together or in a zig-zag fashion, as shown in FIG. 3, to form periodic nodes along the bond line. A single wire thermocouple configuration using constantan wire and using the copper susceptor as the second conductor is shown in FIG. 2 and 7. The spacing of the nodes depends on the desired resolution, but, should be about 0.2 inch or so apart.

The thermocouple will be an open circuit prior to the onset of thermoplastic flow and will not have a voltage output. At the onset of flow, the two thermocouple wires short and produce a thermoelectric voltage proportional to the temperature of the thermocouple junction. The thermocouple will read the temperature directly under the induction head, that being the hottest junction and also the one that is closest to the monitor input. The multinode thermocouple behaves like a series of parallel batteries. The node closest to the monitor produce the highest voltage amplitude because it directly in the hot zone. The same node also acts as a short to any other voltages produced by thermocouple nodes further away from the monitor. Each consecutive junction shorts the potential generated by the preceding node. If the node contact resistance is high, there may be a small error.

DETAILED DESCRIPTION OF THE PREFERRED EMBODIMENT

First, we will describe a typical thermoplastic welding operation and then will describe our monitoring and control system for producing quality welds.

For purposes of this description, "laminates" means a fiber-reinforced organic resin matrix composite having a plurality of plies of prepreg or its equivalent consolidated together and cured, as appropriate. The laminates are prefabricated by any appropriate means including automatic or hand tape or tow fiber placement with autoclave consolidation and cure, resin transfer molding (RTM), or the like. Generally, the organic matrix resin is a thermoplastic, especially PEEK, PEKK, ULTEM polyimide, or K3. In the welding operation, resin in the laminates as well as resin in the susceptor melts, intermixes, and fuses to form the weld. The laminate might also be a thermoset in which case the welding process actually forms a hot melt adhesive bond rather than a weld. We prefer welding, but recognize the analogous process of adhesive bonding of thermosets.

In a thermoplastic laminate, the reinforcing fiber typically is carbon fiber in continuous or chopped form, and generally as tow or woven fabric. While other fibers can be used, modern aerospace requirements most often dictate carbon fibers for their strength and durability, and we prefer them. In thermosets, especially epoxy, the fibers might be graphite.

1. A Moving Coil Welding Operation

Figure 1:
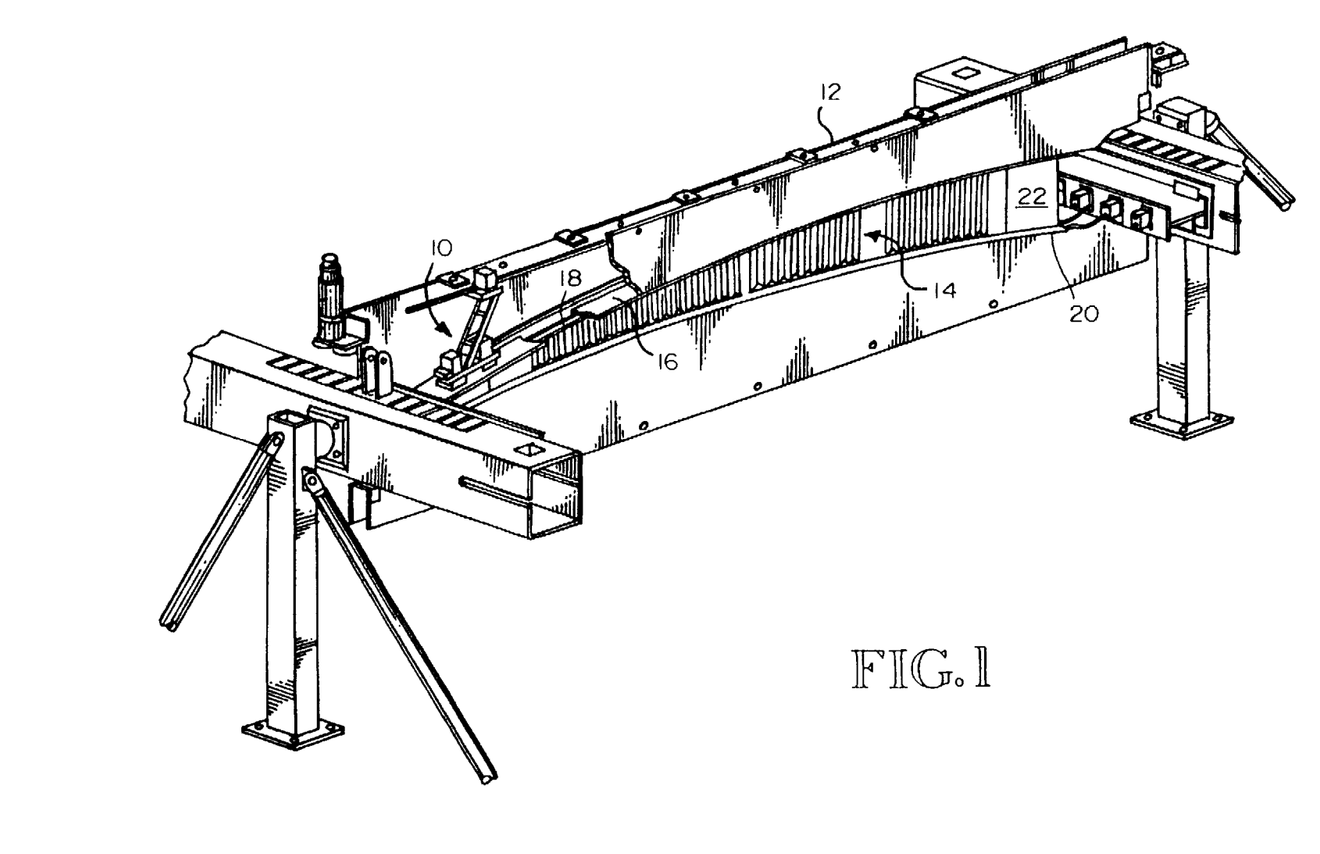
FIG. 1 is a perspective view of a moving coil thermoplastic welding apparatus.

Turning now to FIG. 1, a thermoplastic welding head 10 having leading and trailing pneumatic pressure pads and a central induction coil is supported on tooling headers 12 over the assembled thermoplastic composite parts to be welded. The parts, in this example, include a thermoplastic spar 14 and a thermoplastic wing skin 16, only a small section of which is shown in FIG. 1. The spar 14 is in the form of an "I" beam having a top cap 18, a bottom cap 20, and a connecting web 22. The spar 14 extends lengthwise of the wing of the airplane for which the parts are being assembled, and the wing skin is bonded over the full length and surface area of the spar cap 18 with sufficient strength to resist the tensile and peeling forces the wing will experience in flight. The welding apparatus shown is more fully described in U.S. Pat. No. 5,660,669 which we incorporate by reference. The beams might be all composite construction or a hybrid metal webbed composite capped beam as described in U.S. patent application Ser. No. 08/473,910, which we incorporate by reference. We could also join thermoset skins and spars with a hot melt thermoplastic adhesive.

A susceptor (i.e., a metal foil susceptible to induction heating encapsulated in a thermoplastic resin) 32 (FIG. 2) is inserted between the spar cap 18 and the wing skin 16. Typically the encapsulating resin is the same or a slightly lower melting temperature formulation of the same thermoplastic resin of the spar cap 18 and the lower faying surface of the wing skin 16.

The welding head 10 can be any moving coil apparatus that is capable of applying pressure during induction heating of the bond line to promote fusion and after heating for a period sufficient for the resin to cool and harden in its bonded condition. One suitable welding head is disclosed in our copending U.S. Pat. No. 5,635,094, which we incorporate by reference. A preferred welding apparatus includes an induction coil for inducing eddy currents in the susceptor 32. The eddy currents heat the susceptor by electrical resistance heating and soften or melt the thermoplastic resin in the faying surfaces of the parts so it flows, interdiffuses, and fuses together with softened resin of the wing skin 16 and spar cap 18 or 20 upon cooling. Two suitable induction coils are described U.S. Pat. Nos. 5,444,220 and 5,313,037, which we incorporate by reference. The coil shown in the '037 patent provides zero eddy current at the center with the current density increasing toward the edges. Use of a tailored susceptor is desirable to counterbalance the non-uniform eddy current density that the coil produces from centerline to edge as disclosed in U.S. Pat. No. 5,500,511, which we also incorporate by reference. A selvaged susceptor designed especially for use with the asymmetric induction coil U.S. Pat. No. 5,444,220 is described in U.S. Pat. No. 5,508,496.

We mount the induction coil 34 in the welding head 10 in the center of a lower frame which is pinned to a link connecting the lower frame to an upper frame. The upper frame is pulled by a motive apparatus including a stepper motor driving a drive sprocket and a chain loop through a reduction gear unit. A pair of camroll bearings projects from both sides of the lower frame into cam grooves milled into the inside surfaces of the headers to guide and support the lower frame. A similar set of camroll bearings projects outward from the upper frame into a straight cam groove to guide the upper frame as it is pulled by the chain loop from one end of the wing skin to the other.

The process of welding the wing skin 16 to the spar cap 18 or 20 begins with assembling the parts together with the susceptor 32 interposed between the faying surfaces of the parts. In the case of a wing box, this assembly involves attaching a susceptor 32 to the outer surfaces of the spar caps 18 and 20 and then sandwiching the spars between the upper and lower wing skins. The parts are held in position and squeezed together by a force exerted by a pair of air bearing pads to which air under pressure is delivered by way of air lines and distributed to the air bearing pressure pads by separate air lines. The air to the pads reduces the frictional drag on the pressure pads on the top surface of the wing skin and helps to cool the parts after the coil has passed. We move the induction coil 34 along the intended bond line over the outer surface of the two wing skins in alignment with the susceptors while producing an alternating magnetic field which projects thorough the wing skins and around the susceptor, generating eddy currents in the susceptor. The eddy currents that the magnetic field induces are of sufficient amperage to heat the susceptor, raising the temperature of the thermoplastic material in the faying surfaces to its softening or melting temperature. After the first pass of the welding head 10, we repeat the process three or more times, usually increasing the power to the coil after the second pass and, if desired, increasing the pressure exerted by air cylinders on the pressure pads.

The bond strength improves with repetitions of the welding passes of the welding head over the same bond line. Multiple passes of the induction coil serves to create the optimal conditions for achieving a fusion bond with the desired characteristics of continuity over the entire bond line, and substantial molecular inter diffusion of the materials in the faying surfaces to produce a bond line of high pulloff strength with the complete or nearly complete absence of voids as described in U.S. Pat. No. 5,486,684 which we also incorporate by reference. We gain higher pulloff strengths using a barbed susceptor of U.S. patent application Ser. No. 08/486,560 on the bond line.

The mechanisms for achieving a fusion bond include intimate contact and "healing." Intimate contact of the two faying surfaces is a function of force exerted on the parts to squeeze them together, and temperature-dependent viscosity. The force exerted on the parts is distributed over a certain surface area as interfacial pressure tending to bring the faying surfaces together, and the viscosity of the surface material is manifested by the tendency of high spots in the surface to yield of flow so that low spots in the two surfaces can come together. "Healing" is partly a process in which molten or softened materials flow together and blend where they come into contact, and partly a process of molecular penetration of the polymer chains in the material of one surface into the molecular matrix of the material in the other faying surface. The average penetration distance of the polymer chains, without the beneficial mixing effect achieved by flowing the materials in the faying surfaces, increases as a quarter power of time (i.e., $t^{0.25}$).

Objective and easily made observations of a bond line that are indicative of the quality of the bond are reduction in bond line thickness, improved ratio of bonded unbonded surface area in the bond line (or expressed conversely, a reduction of the amount of unbonded surface area in the bond line), and improved pass-through of a bonding resin through openings in the susceptor. We can measure these factors are easily measured by examining the welded part and then pull testing short sections to destruction, which also provides direct bond strength data.

Irregularities such as hollows, depressions and asperities (i.e., peaks) in the faying surfaces of the parts, and other deviations from perfect flatness can interfere with and prevent continues intimate contact along the full surfaces of the parts where bonding is intended. These deviations from perfect flatness include small scale surface features such as asperities, depressions or hollows, scratches and bumps, and also large scale features such as waviness in the direction of the major length dimension, twist about the longitudinal axis, dishing or sagging of "T" beam flanges, and warping such as humping or bowing in the longitudinal direction. The structural susceptor of U.S. patent application Ser. No. 08/471,625 is particularly suited for dealing with these problems, and we incorporate it by reference.

2. Typical Susceptors

Our susceptor might be "tailored," "selvaged," "structural," or "reinforced" as those terms are defined in our earlier patent applications. If "reinforced" so that the foil strips run in tandem with warp fibers or warp tows, barb tabs only extend outwardly in the direction opposite the carbon fiber. Otherwise, the barbs would tend to prop the foil away from the fiber.

Our barbed susceptor usually is fabricated from an age-hardened Invar foil having a thickness of from 0.003–0.010 in (0.075–0.25 mm). Other materials having good electrical conductivity and high magnetic permeability (so that it is a good susceptor) may be used. Our barbed susceptor has a pattern of openings made by forming barbs in the Z-axis by folding prongs out of the X-Y plane. The result is a susceptor that resembles barbed wire. Each prong of the susceptor might also be barbed like a fishhook. Such barbs are readily formed simply by scoring the prong with a cut that starts relatively closer to the body of the susceptor and extends into the prong at an angle running from the surface toward the tip. The Invar is a "smart" susceptor as we described in U.S. patent application Ser. No. 08/469,604 which helps us avoid overheating.

The barbed susceptor may also have a pattern of openings in the X-Y plane with uniform line widths of about 7 mils (0.18 mm) to define the peripheries of the diamond, as our other susceptors do, so that a fusion bond can occur through the susceptor. Of course, the openings can have shapes other than diamonds. The diamonds are easy to form by etching, stamping, or expanding and provide a convenient mechanism to control the longitudinal and transverse impedance, as we described in our other patent applications. As we previously described, the diamonds can have L/W ratios less than or equal to 1.0 in our selvaged susceptor where we are interested in influencing the eddy currents to run transversely into the solid edge strips. If we use a cup coil of U.S. Pat. No. 5,313,037 and a tailored susceptor, we want L/W to be greater than one so that the longitudinal impedance is less the impedance and the eddy currents turn longitudinally although the coil drives them transversely. Other shapes can be used for the openings to create a foil that has a uniform impedance or whatever desired ratio in the longitudinal and transverse directions.

The barbed susceptor might be a "reinforced" multistrip susceptor similar to that described in U.S. patent application Ser. No. 08/469,986 with the strips being periodically cut to create Z-plane barbs. This multistrip concept is what we prefer because it is the easiest to manufacture. Such a susceptor may actually be best suited for resistance welding like that described in U.S. patent application Ser. No. 08/470,168 or heating in our induction solenoid coil heating workcell (see, e.g., U.S. Pat. No. 5,624,594, because these two processes induce currents that run longitudinally through the susceptor. The multistrip susceptor has low longitudinal impedance.

Our goal is to produce aircraft structure that eliminates fasteners. Welded structure will be far less expensive because welding eliminates the labor to drill holes accurately and to inspect the fasteners after installation. We also will avoid other problems that fasteners introduce, such as sealing around the fastener and the holes, mismatch of materials, and arcing from the fasteners. To replace the fasteners, however, requires confidence that the welds are uniform and consistent, because a failure at any weak point in the weld could lead to catastrophic unzipping of the entire welded structure. The present invention provides improved pulloff strength. One of the most important problems with quality welding is temperature uniformity along the bond line to achieve uniform and complete melt and cure of the resin. Being a "smart" susceptor, our barbed susceptor has a Curie temperature slightly higher than the welding temperature (i.e., about 700° F.) so the possibility of disastrous overheating is reduced. Smart susceptors are described in greater detail in U.S. Pat. No. 08/469,604, which we incorporate by reference.

We embed the foil in the resin to simplify the welding process. Making a foil/resin tape eliminates the steps of applying separate layers of resin between the respective elements in a composite-susceptor-composite assembly. It also ensures that there will always be adequate resin proximate the susceptor and essentially uniform resin thickness across the welding bond line. Our typical tape is about 2 inches wide with K3A Avimid resin (an aromatic polyimide), although we can use PEEK, PEKK, PES, PEK, ULTEM polyimide or any other thermoplastic. The resin must be compatible with the matrix resin in the composite and generally is the same resin as the matrix resin when welding thermoplastic composites. For welding thermoset composites, the resin will likely be a comparable thermoplastic formulation of the matrix resin in the composites or a compatible resin.

To form a structural susceptor, we can take a barbed susceptor and loosely bond reinforcing fiber and thermoplastic films in alternating layers symmetrically on both sides, analogously to what we did in U.S. patent application Ser. No. 08/471,625. The fiberglass reinforcement prevents the resin from fracture under the residual strain left after welding. Higher ductility resins such as PEEK, PEK and ULTEM also resist fracture better than some thermoplastics. The thermoplastic films are preferably the same resin as that used to embed the metal foil and to fabricate the laminates. Sheet thicknesses for these films are usually about 0.001–0.002 inch (0.025–0.050 mm). The woven fibers are preferably oriented perpendicular and parallel to the longitudinal axis of the weld.

The structural susceptor is generally loosely bonded together by heat or pressure or both, but could be of essentially unitary construction if desired. Being loosely bonded helps in gap filling. We use at least two layers of fiber and thermoplastic on each side of the susceptor, but the absolute number is not critical. We have tested four different styles of fiberglass and achieved similar results with each, so we do not believe that the type or style of fiberglass is critical. We have tested four different styles of fiberglass and achieved similar results with each, so we do not believe that the type or style of fiberglass is critical.

The fiber suppresses cracking if the fiber volume is at least about 30%. The thermoplastic ensures a resin rich weld.

"Smart" susceptors are magnetic alloys that have high magnetic permeabilities but that also have their magnetic permeabilities fall to unity at their Curie temperature. At the Curie temperature, then, the susceptors become inefficient heaters. The alloys are selected to have Curie points close to the process temperature of welding and have low thermal expansion coefficients to match composites. The preferable alloys for this application are in a composition range of from 36% Ni to 44% Ni in Fe. Additional alloying elements such as Al, Cb and Ti allow these low expansion iron-nickel alloys to be age hardened and add to the cap/skin pulloff strength.

3. Temperature Monitoring

As we have discussed, knowing the temperature in the bond line is crucial to achieving a quality weld. We need to know that the full area of the bond line has reached the flow temperature of the resin. We need to know that we have not overheated the resin to introduce the problems of excessive heating, like porosity, delamination, or resin degradation/ charring. We need to avert overheating in the bulk materials to avoid sagging. If we can monitor the bond line temperature in real time, we can adjust the power to the coil, the speed of the weld head, or both to insure a better weld along the entire bond line.

The present invention monitors the bond line temperature with an embedded thermocouple which is active in the region under the induction coil, triggered by the onset of resin flow. We can identify that we have heated the bond line high enough to fuse the resin and can monitor the temperature during the time that the resin is molten.

Figure 4:
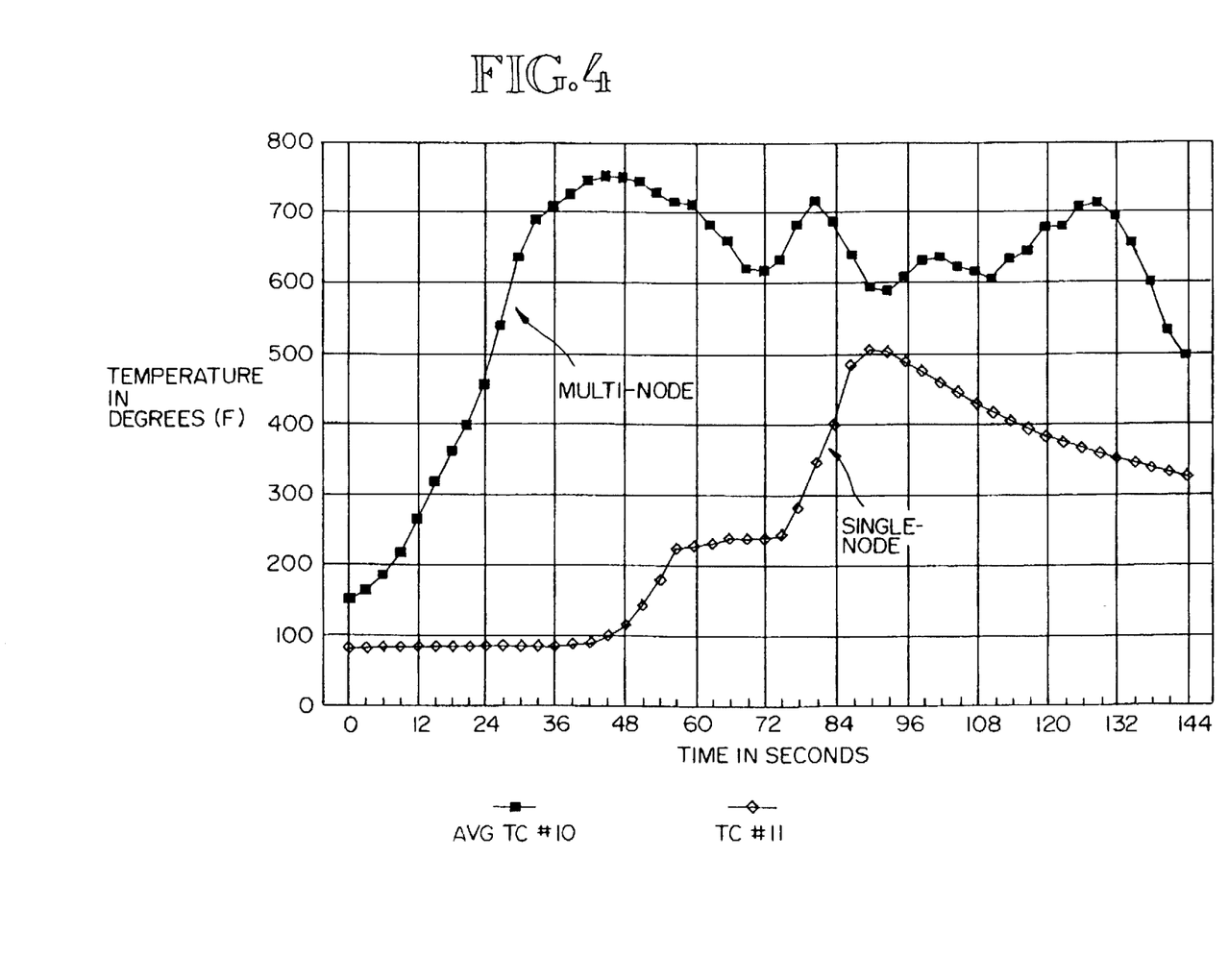
FIG. 4 is a calibration curve showing bond line temperatures for a multinode thermocouple and for a single node thermocouple in a welding operation similar to that illustrated in FIG. 1.

We welded a test panel with a sliding junction (multinode) thermocouple 36 (FIG. 3) in the bond line. The thermocouple 36 was made with two bare Chromel/aluminel, AWG #36 wires that we wound in a zig-zag way on a piece of thermoplastic resin 38 (or encapsulate the wires in the resin) to separate the thermocouple 36 from the susceptor 32. We positioned the thermocouple half way between the center of the bond line and the edge. We placed a standard thermocouple in the bond line to obtain a reference temperature. FIG. 4 shows a plot of temperature versus time for both thermocouples. The multinode thermocouple 36 gave temperature readings with meter M about 150 degrees F. higher than the standard thermocouple located flush with the surface of the bond line. We believe this discrepancy arose because some nodes make intimate contact with the susceptor strands.

Figure 5:
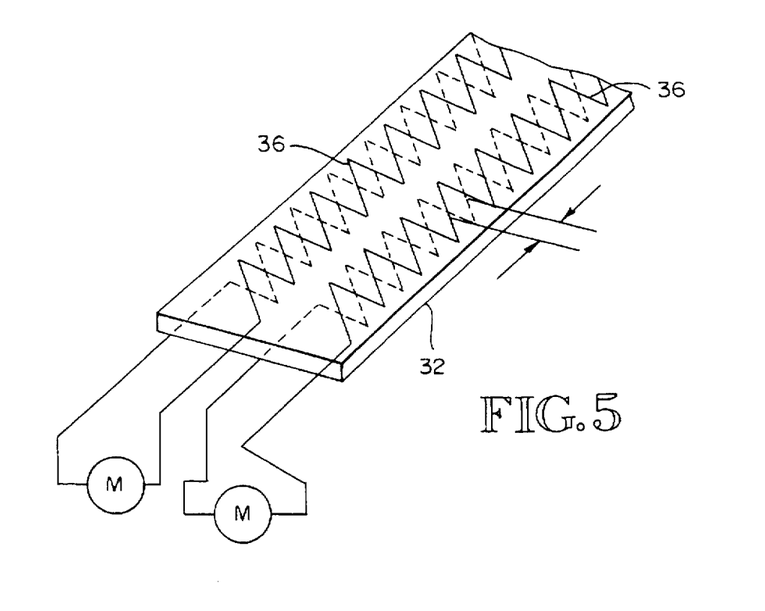
FIG. 5 is a schematic illustration of a dual multinode thermocouple system.
Figure 6:
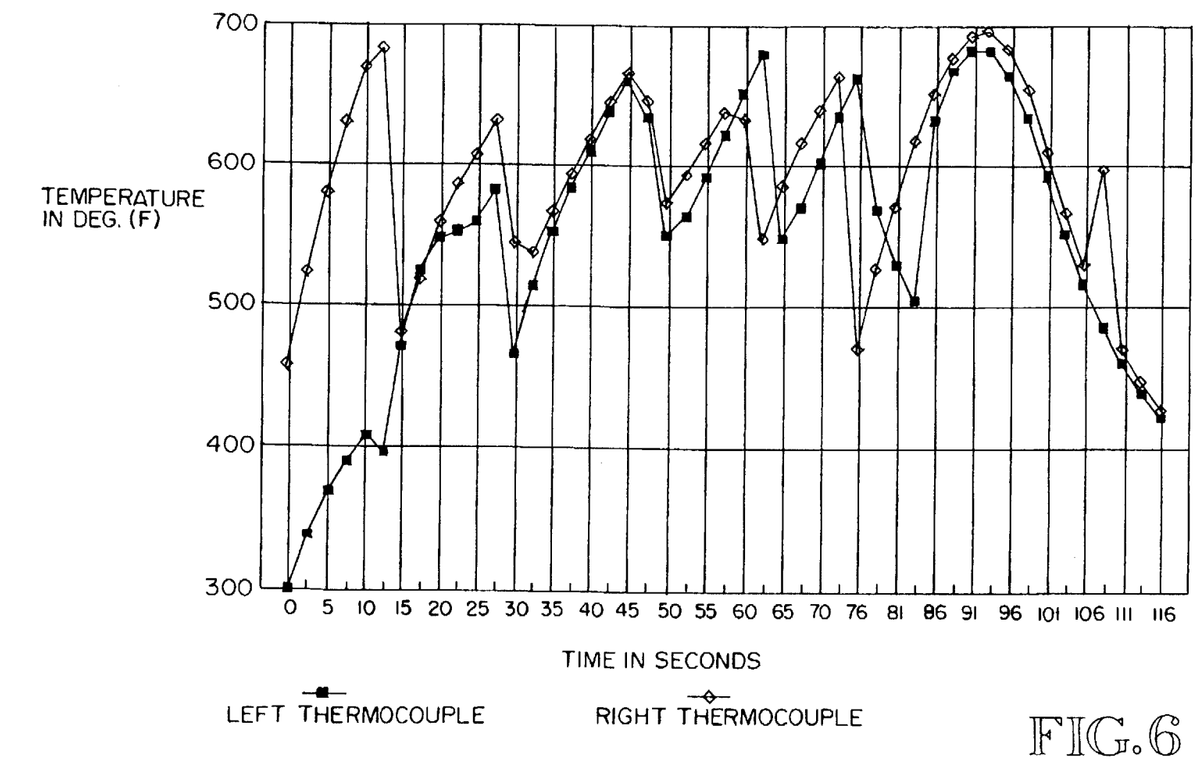
FIG. 6 is a calibration curve for a test panel using the dual multinode thermocouple system illustrated in FIG. 5.

We also welded a second test panel with two multinode thermocouples in the bond line. As shown in FIG. 5, the thermocouples were located halfway between the center and the edge on each side of the bond line, with nodes spaced one inch apart. The two multinode thermocouples gave peak temperature readings every 15 seconds. FIG. 6 shows the charted data. A reading taken every 15 seconds corresponds to a one inch travel of the induction coil. The output of the two thermocouples tracked within 25 degrees F.

The thermocouple might be of the constantan type 36A (FIG. 2) in which a single wire is embedded in the structure and the second conductor is the susceptor itself. Such a thermocouple minimizes the amount of extraneous metal introduced to the welded structure. We believe that either a conventional or a constantan thermocouple will produce reasonable results.

As shown in FIG. 2, the output of the meter M can be a control signal to controller 40 to adjust the speed of the coil 34, or its power or both, to increase or decrease the rate of heating or cooling as appropriate to achieve the weld. As shown in FIG. 7, with the appropriate control function, the meter M can be deleted.

By locating the constantan thermocouples 36 or 36A near the outer edges of the bond line, as shown in FIG. 5 and 7, we can use the voltages generated by the spaced thermocouples as a guidance control function using the two thermocouple outputs in conjunction with a differential amplifier bridge circuit. When the coil moves off center, it will produce uneven heating across the bond line. This heating will result in a differential thermocouple output which we use as a control function to restore the coil to the center of the susceptor, and, thereby, restore uniform heating across the bond line.

A drawback to this method of monitoring and control for induction welding is that it is intrusive in that the thermocouple wires stay in or near the bond line. However, the diameter of the thermocouple wires can be as little as 0.001 inch and they should not present any structural problems. The insulation of the thermocouple wire should be the same thermoplastic resin as that being welded and should not have any adverse effect on the structural properties of the bond.

While we have described preferred embodiments, those skilled in the art will readily recognize alterations, variations, and modifications which might be made without departing from the inventive concept. Therefore, interpret the claims liberally with the support of the full range of equivalents known to those of ordinary skill based upon this description. The examples are given to illustrate the invention and not intended to limit it. Accordingly, limit the claims only as necessary in view of the pertinent prior art.

We claim:

1. A temperature monitoring system for measuring the temperature of a bond line in thermoplastic welding operations by detecting the onset of flow of a thermoplastic resin, comprising:

(a) a susceptor along the bond line, the susceptor having a centerline and two edges;

(b) a moving coil for moving over the bond line and for inducing eddy currents in the susceptor to heat the bond line;

(c) a first multinode thermocouple overlying the susceptor and creating a reference signal representative of the temperature of the bond line under the moving coil when the resin flows;

(d) organic matrix resin electrically isolating the thermocouple from the susceptor; and (e) means for controlling at least one of the motion and the power of the moving coil in response to the reference signal representative of the temperature.

2. The system of claim 1 wherein the thermocouple is located generally about one half way between the centerline of the susceptor and one edge.

3. The system of claim 1 further comprising a second multinode thermocouple overlying the susceptor in substantially parallel arrangement with the first thermocouple, the first and second thermocouples being laterally spread near respective edges of the susceptor so that a sensed difference signal detected from the two thermocouples provides a control signal for correcting misalignment of the coil over the susceptor.

4. The system of claim 3 wherein the thermocouples have nodes at least about every inch.

5. The system of claim 3 wherein each thermocouple includes a threaded constantan wire as a first conductor and the susceptor as a second conductor for temperature sensing.

6. The system of claim 1 wherein the thermocouple is encapsulated in the organic matrix resin.

7. A thermoplastic weld, comprising:

(a) a fiber-reinforced thermoplastic resin composite;

(b) a susceptor capable of heating by induction embedded within the composite to define a bond line; and (c) at least one multinode thermocouple extending along the bond line near the susceptor.

8. A method for improving the quality of induction thermoplastic welding by correcting overheating arising from misalignment of an induction coil over a susceptor having two edges, comprising the steps of:

(a) using a pair multinode thermocouples to sense simultaneously an output from each thermocouple representative of the temperature of the bond line, the thermocouples being positioned so that a first thermocouple measures the temperature along one edge of the susceptor while a second thermocouple measures the temperature along the second edge; and (b) moving the coil in response to a difference in temperature along the edges to restore alignment of the coil and the susceptor as measured by uniform outputs from the thermocouples.

9. The weld of claim 7 wherein the composite is a carbon fiber-reinforced thermoplastic polyimide.

10. The weld of claim 7 wherein the thermocouple includes a constantan wire as a first conductor and the susceptor as a second conductor.

11. The system of claim 1 wherein the thermoplastic resin and the organic matrix resin are polyimides.

12. The system of claim 11 wherein the polyimides are different.

13. The system of claim 1 wherein the susceptor includes a plurality of openings.

14. The system of claim 13 wherein the susceptor includes a metal mesh.

15. A temperature monitoring system for monitoring the temperature of a thermoplastic weld during formation of the weld, comprising:

(a) a thermocouple in the weld;

(b) a controller connected with the thermocouple for monitoring the weld temperature based upon a signal generated by the thermocouple;

(c) a heater associated with the controller and being adjustable in power in correlation with the signal of the weld temperature.

16. The system of claim 15 wherein the heater includes an induction coil movable over the weld for inducing eddy currents in a susceptor in the weld.

17. The system of claim 16 further comprising a motive system connected with the controller and coil for moving the coil in response to the signal of the weld temperature.

18. A system for monitoring and adjusting the temperature of a thermoplastic of a thermoplastic weld, comprising:

(a) a heater for heating the weld;

(b) a thermocouple in the weld for sensing the temperature of the weld; and (c) a controller coupled to the thermocouple for adjusting the heater in response to the temperature of the weld as sensed by the thermocouple.

* * * * *